(12) United States Patent
Park et al.

(10) Patent No.: US 9,408,021 B2
(45) Date of Patent: Aug. 2, 2016

(54) BLUETOOTH HEADSET

(71) Applicant: Samsung Electronics Co., Ltd., Gyeonggi-do (KR)

(72) Inventors: Ko-Eun Park, Gyeonggi-do (KR); Seung-Tae Ryu, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/607,770

(22) Filed: Jan. 28, 2015

(65) Prior Publication Data

US 2015/0215440 A1    Jul. 30, 2015

(30) Foreign Application Priority Data

Jan. 28, 2014   (KR) .................. 10-2014-0010166

(51) Int. Cl.
| H04M 1/00 | (2006.01) |
| H04W 4/00 | (2009.01) |
| H04M 1/05 | (2006.01) |
| H04M 1/60 | (2006.01) |

(52) U.S. Cl.
CPC .............. *H04W 4/008* (2013.01); *H04M 1/05* (2013.01); *H04M 1/6066* (2013.01); *H04M 2250/02* (2013.01)

(58) Field of Classification Search
CPC .... H04R 1/1033; H04R 5/033; H04R 1/1041; H04R 1/1016; H04R 1/105; H04R 1/1058; H04R 2420/07; H04R 5/0335; H04R 1/1008; H04R 1/1066; H04R 2201/107; H04R 1/086; H04R 1/1025; H04R 1/1083; H04R 2201/003; H04R 2420/01; H04M 1/05; H04M 1/6058; H04M 1/04; H04M 1/15

See application file for complete search history.

(56) References Cited

U.S. PATENT DOCUMENTS

| 8,891,798 | B1 * | 11/2014 | Laffon de Mazieres | H04R 1/1033 381/370 |
| 2008/0317274 | A1 | 12/2008 | Kim | |
| 2010/0166207 | A1 * | 7/2010 | Masuyama | H04R 1/1041 381/74 |
| 2010/0193221 | A1 * | 8/2010 | Schoeffmann | H04R 1/1033 174/135 |

FOREIGN PATENT DOCUMENTS

| JP | U3155288 | 11/2009 |
| KR | 200200181 | 10/2000 |
| KR | 1020070075024 | 7/2007 |

* cited by examiner

*Primary Examiner* — Golam Sorowar

(74) *Attorney, Agent, or Firm* — The Farrell Law Firm, P.C.

(57) ABSTRACT

A Bluetooth headset is provided, which includes a band part including a first end and a second end; a first ear part provided at the first end of the band part, wherein the first ear part includes a first receiver and a first ear cap surrounding the first receiver; a second ear part provided at the second end of the band part, wherein the second ear part includes a second receiver and a second ear cap surrounding the second receiver; a first coupling case that covers the first ear part; and a second coupling case that covers the second ear part. The first coupling case and the second coupling detachably couple to each other such that the band part is arranged in a wearable ring shape.

20 Claims, 6 Drawing Sheets

BLUETOOTH HEADSET

PRIORITY

This application claims priority under 35 U.S.C. §119(a) to Korean Patent Application Serial No. 10-2014-0010166, which was filed in the Korean Intellectual Property Office on Jan. 28, 2014, the entire content of which is incorporated herein by reference.

BACKGROUND OF THE INVENTION

1. Field of the Invention

The present invention relates generally to a Bluetooth headset, and more particularly to a Bluetooth headset that can be worn on the neck of the user in the form of a necklace or on the wrist of the user in the form of a bracelet.

2. Description of Related Art

In general, a portable terminal refers to a device which allows a user to use a variety of functions, such as a mobile communication function, an electronic note function, an Internet connection function, and a multimedia function, while carrying the device. Recently, various functions have been integrated into one portable terminal often called a smart phone.

Mobile communication modules for, for example, RF communications, Infrared ray communications, Bluetooth, and ZigBee, may be mounted in the portable terminal such that wireless communications can be performed between terminals. Among them, the Bluetooth module wirelessly connects portable communication devices located within a predetermined range, and also allows for communications between various digital equipment through the use of radio frequencies.

In particular, a Bluetooth headset is a kind of hands-free device of a portable terminal, and is wirelessly connected to the portable terminal to perform communications. The Bluetooth headset may include a pair of ear speakers worn on the ears of a user and used to transfer sounds from the portable terminal to the user. The pair of ear speakers are provided at opposite ends of a band which may be positioned on the neck or head of the user. Bluetooth headsets may be classified into single-sided Bluetooth headsets, which can be worn on one ear of a user, and a neck band headsets which can be worn on both ears of a user, according to the presence of the neck band.

In the neck band Bluetooth headset (hereinafter referred to as a Bluetooth headset), one ear speaker and the other ear speaker are spaced apart from each other such that the Bluetooth headset is worn on both ears of a user. When a user uses the Bluetooth headset, a pair of ear speakers are inserted into the ears of the user to be used, but when the user does not use the Bluetooth headset, it may be suspended on the neck of the user or put into a bag to be carried.

When the Bluetooth headset is carried in a bag, it may be difficult to carry due to the size of the Bluetooth headset or the C shape of the Bluetooth headset, and when the Bluetooth headset is carried improperly, the ear speakers or the band may be damaged.

Further, the Bluetooth headset is provided with a control portion, such as a power source and a battery, at a central portion of the band. Since the control portion is provided with a battery or an internal circuit such as a Bluetooth module, the control portion adds considerable weight to the entire weight of the Bluetooth headset. Thus, when the user wears the Bluetooth headset, the weight of the Bluetooth headset is concentrated in the location of the control portion, due to its weight. Moreover, when a user does not wear the ear speakers in his ears, but suspends the Bluetooth headset on the back part of his head or neck, the Bluetooth headset move downward and potentially drop due to the weight of the control portion. As a result, the danger of dropping the Bluetooth headset increases with even the slightest movement of the user. This results in the danger of damaging or losing the Bluetooth headset.

SUMMARY

The present invention has been made to address at least the above-mentioned problems and disadvantages in the conventional art, and to provide at least the advantages described below.

Accordingly, an aspect of the present invention is to provide a Bluetooth headset which can be worn on the body of a user, for example, on the neck of the user in the form of a necklace or on the wrist of the user in the form of a bracelet to be carried, so that the portability of the Bluetooth headset can be improved In accordance with an aspect of the present invention, a Bluetooth headset is provided. The Bluetooth headset includes a band part including a first end and a second end; a first ear part provided at the first end of the band part, wherein the first ear part includes a first receiver and a first ear cap surrounding the first receiver; a second ear part provided at the second end of the band part, wherein the second ear part includes a second receiver and a second ear cap surrounding the second receiver; a first coupling case that covers the first ear part; and a second coupling case that covers the second ear part. The first coupling case and the second coupling case detachably couple to each other such that the band part is arranged in a wearable ring shape.

In accordance with another aspect of the present invention, a Bluetooth headset is provided. Bluetooth headset includes a band part, which includes a fixed band including a first end; a second end; at least one control portion positioned between the first end and the second end; a first guide stopper positioned at the first end of the fixed band; and a second guide stopper positioned at the second end of the fixed band, a first flexible band extending from the first end of the fixed band; a second flexible band extending from the second end of the fixed band; a first ear part provided at one end of the first flexible band, wherein the first ear part includes a first receiver and a first ear cap surrounding the first receiver; a second ear part provided at one end of the second flexible band, wherein the second ear part includes a second receiver and a second ear cap surrounding the second receiver; a first coupling case that covers the first ear part; and a second coupling case that covers the second ear part. The first coupling case and the second coupling case detachably couple to each other such that the band part is arranged in a wearable ring shape. The first coupling case and the second coupling case are configured to move between the respective first and second guide stoppers and the first and second ear parts on the first and second flexible bands. The first coupling case and the second coupling case are configured to detachably couple to the respective first and second guide stoppers.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

The present invention may have various modifications and various embodiments, among which specific embodiments will now be described more fully with reference to the accompanying drawings. However, it should be understood that there is no intent to limit the present invention to the specific embodiments. On the contrary, the present invention covers all modifications, equivalents, and alternatives falling within the scope of the invention.

Although the terms, including an ordinal number such as first, second, etc., can be used for describing various elements, the elements are not restricted by the terms. The terms are only used to distinguish one element from another element. For example, without departing from the scope of the present invention, a first structural element may be named a second structural named. Similarly, the second structural element also may be named the first structural element. As used herein, the term "and/or" includes any and all combinations of one or more of the associated listed items The relative terms, such as a front surface, a rear surface, an upper surface, and a lower surface, which are described with reference to the drawings may be replaced by ordinal numbers such as first and second. In the use of ordinal numbers, such as first and second, their order is determined in the mentioned order or arbitrarily and may be changed if necessary.

The terms used in this application are for the purpose of describing particular embodiments only and are not intended to limit the invention. Singular forms are intended to include plural forms unless the context clearly indicates otherwise. In the description, it should be understood that the terms "include" or "have" indicate the existence of a feature, a number, a step, an operation, a structural element, parts, or a combination thereof, and do not previously exclude the existence or probability of the addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. It should be interpreted that the terms, which are identical to those defined in general dictionaries, have the meaning identical to that in the context of the related technique. The terms should not be ideally or excessively interpreted as a formal meaning.

In the embodiment of the present invention, a Bluetooth headset may refer to a device which can be paired with a portable device such as a smartphone, a mobile phone, a navigation device, a gaming device, a TV, a vehicular head unit, a notebook computer, a laptop computer, a tablet computer, a Personal Media Player (PMP), and Personal Digital Assistants (PDA) to emit sounds.

Figure 1:
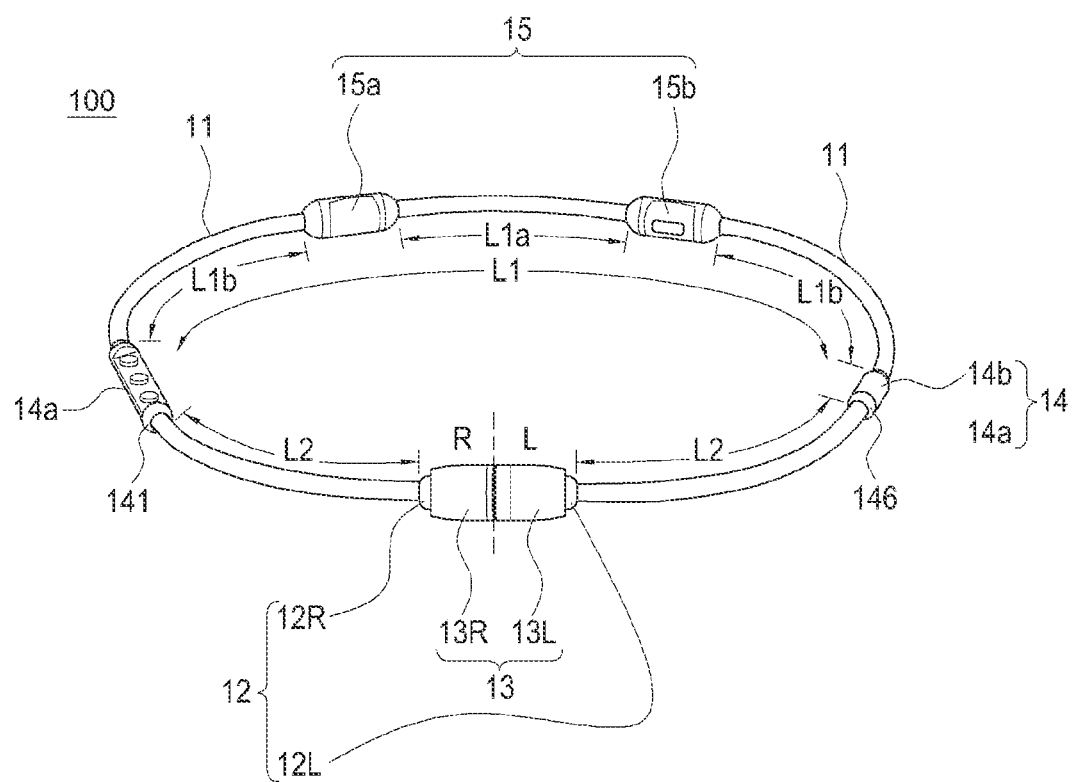
FIG. 1 illustrates a Bluetooth headset, according to an embodiment of the present invention.

FIG. 1 illustrates a Bluetooth headset, according to an embodiment of the present invention.

Referring to FIG. 1, the Bluetooth headset 100, according to the embodiment of the present invention, includes a band part 11, ear parts 12, and a coupling case 13.

The band part 11 has a hard portion and a flexible portion, which may be easily deformed. In detail, the band part 11 includes a fixed band L1 and a flexible band L2. The ear part 12, more specifically, a left ear part 12L and a right ear part 12R are provided at ends of the band part 11. The fixed band L1 is formed of a hard material to be held on the of the head or the neck of a user, and includes at least one control portion 15 and at least one guide stopper 14.

The control portion 15 includes first and second control portions 15a and 15b, with disposed on a central portion of the band part 11. At least one (the first control portion 15a in the embodiment of the present invention) of the first control portion 15a and the second control portion 15b is provided with a battery such that electric power is provided to the Bluetooth headset 100, and the battery may be recharged through a separate external charging module. The remaining control portion 15 (the second control portion 15b in the embodiment of present invention) of the first control portion 15a and the second control portion 15b is provided with internal modules for pairing the Bluetooth headset 100 with an external electronic device. It will be exemplified that the weight of the control portion 15 according to the embodiment of the present invention is distributed to opposite sides of the fixed band L1. The two control portions 15a and 15b are mounted to the fixed band L1 in consideration of convenience in a first mode M1 or a second mode M2 of the Bluetooth headset 100, which will be described below. However, the control portion 15 is not limited thereto. For example, one control portion 15 may be provided at the center of the band part 11 and a battery and an internal circuit of the Bluetooth module may be mounted to the control portion 15 together. Thus, the number and locations of control portion 15 may be changed or modified in consideration of distribution of weight or the design of the Bluetooth headset 100.

It has been shown that the fixed band L1 according to the embodiment of the present invention is formed of a hard material and is located between two guide stoppers 14, which will be described below. However, the locations or material of the fixed band L1 is not limited thereto. For example, if the fixed band L1 is disposed on the neck or the back part of the head of the user, the entire fixed band L1 may be formed of a flexible material. That is, a portion between the first control portion 15a and the second control portion 15b may remain fixed to the neck or the back part of the head of a user due to the weight of the first control portion 15a and the second control portion 15b provided with a battery, a main circuit, and a Bluetooth module.

The portion of the fixed band L1 between the first control portion 15a and the second control portion 15b (hereinafter, referred to as a first fixed band L1a) is formed of a hard material and may be fixed to the neck or the back part of the head of a user. The portion between the first guide stopper 14a and the second guide stopper 14b (hereinafter, referred to as a second fixed band L1b) may be formed of a flexible material. Thus, the first fixed band L1a may be fixed to the neck or the back part of the head of the user, and the second fixed band L1b and the flexible band L2 may be flexibly varied at an end of the first fixed band L1a, according to the user's preference and comfort. As discussed above, the materials or locations of the fixed band and the flexible band may be changed or modified in consideration of the type or the usage of the Bluetooth headset 100.

Figure 2A:
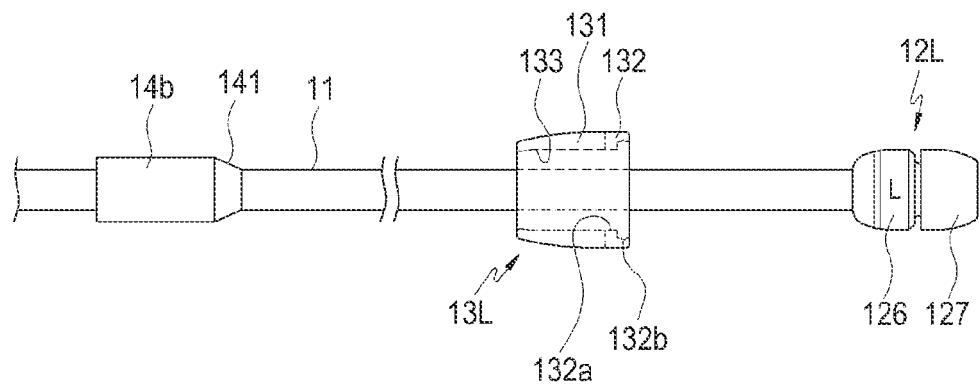
FIGS. 2A and 2B illustrate a left coupling case separated from a first ear part and coupled to a guide stopper of a Bluetooth headset, according to an embodiment of the present invention.
Figure 2B:
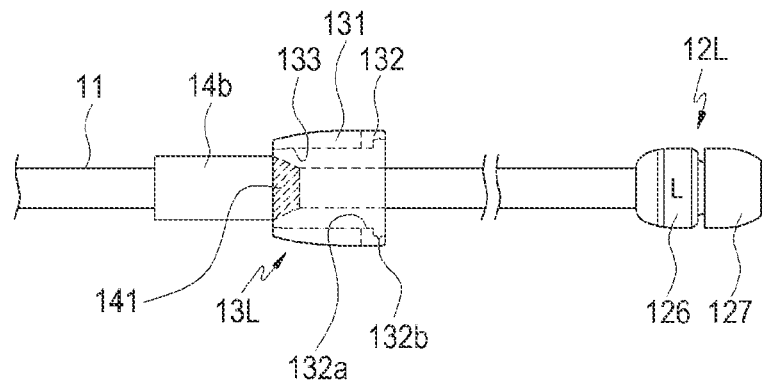
Figure 3A:
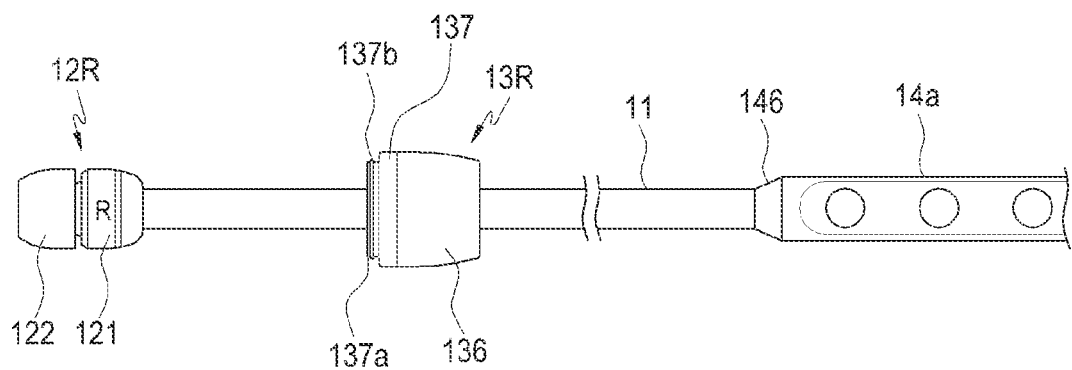
FIGS. 3A and 3B illustrate a right coupling case separated from a second ear part and coupled to a guide stopper of a Bluetooth headset, according to an embodiment of the present invention.
Figure 3B:
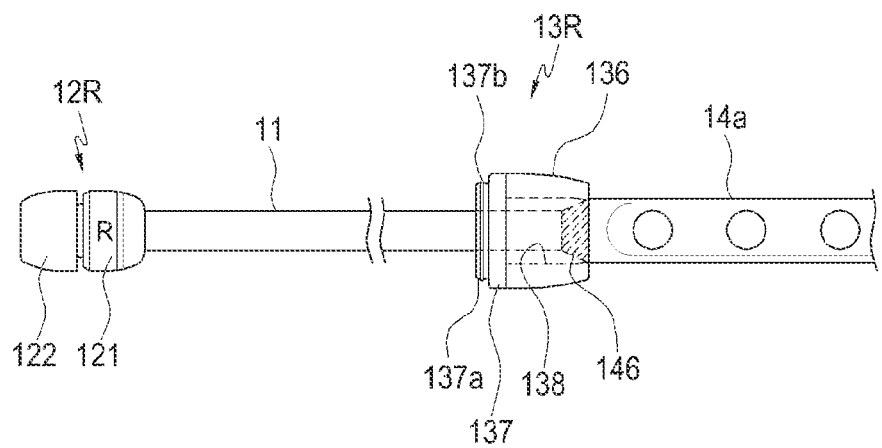

FIGS. 2A and 2B illustrate a left coupling case separated from a first ear part and coupled to a guide stopper of a Bluetooth headset, according to an embodiment of the present invention. FIGS. 3A and 3B illustrate a right coupling case separated from a second ear part and coupled to a guide stopper of a Bluetooth headset, according to an embodiment of the present invention.

Referring to FIGS. 2A, 2B, 3A and 3B (also see FIG. 1 showing the entire Bluetooth headset), a pair of guide stoppers 14 are provided on the fixed band L1 to be spaced apart from the first and second control portions 15a and 15b such that the coupling case 13 is fixed to the band part 11. The guide stopper 14 includes a first guide stopper 14a and a second guide stopper 14b at opposite ends of the fixed band L1. At least one of the pair of guide stoppers 14, that is, the second guide stopper 14b in the embodiment of the present invention, includes a button part in which buttons for adjusting volume or switching on or off electric power.

The first and second guide stoppers 14a and 14b are configured to limit movement of the coupling case 13, which will be described below, from the band part 11.

In detail, the first and second guide stoppers 14a and 14b fix the coupling case 13, which is separated from the left and right ear parts 12L and 12R, to prevent the coupling case 13 from moving from the flexible band L2 to the fixed band L1 and fix the location of the coupling case 13 on the flexible band L2.

The first and second guide stoppers 14a and 14b, in detail, portions 141 and 146, are formed of a resilient material, for example, rubber or silicon. Accordingly, the first and second guide stoppers 14a and 14b may be introduced into rear openings 133 and 138 of the coupling case 13 to be fixed. That is, where the rear openings 133 and 138, are rear openings to a first body 131 and a second body 136, respectively, which will be described below.

The first and second guide stoppers 14a and 14b are configured to have a predetermined weight such that when a user wears the Bluetooth headset 100 on his or her ears by bending the flexible band L2, the fixed band L1 stably remains positioned on the rear part of the neck or the back part of the head of the user.

The flexible band L2 extends from opposite ends of the fixed band L1, and the left ear part 12L and the right rear part 12R are provided at ends of the fixed band L1. The flexible band L2 is provided to be bent at ends of the fixed band L1. When a user wears the left ear part 12L and the right ear part 12R on the left and right ears, respectively, the Bluetooth headset 100 may be worn on the ears of the user by deforming the flexible band L2 while the fixed band L1 remains positioned on the neck or the back part of the head of the user (see FIG. 7B).

The ear parts 12 are provided at the ends of the flexible band L2. The pair of ear parts 12 are a left ear part 12L worn on the left ear of the user and a right ear part 12R worn on the right ear of the user. The left and right ear parts 12L and 12R may include a pair of receivers 121 and 126 and a pair of ear caps 122 and 127. In detail, the pair of receivers 121 and 126 are provided at ends of the flexible band L2, and are worn on the ears of the user to output sounds.

The pair of receivers 121 and 126 are devices for outputting sounds such that an audio signal applied through the control portions 15 may be transferred to the user. The pair of receivers 121 and 126 are a left receiver 121 and a right receiver 126 provided at opposite ends of the band part 11, that is, at the left and right sides of the band part 11.

The pair of ear caps 122 and 127 are provided to surround the pair of receivers 121 and 126. In detail, the pair of ear caps 122 and 127 are detachably provided on a front surface of the receivers 121 and 126, and may be provided to have large, medium, and small sizes, according to the size of the ears of the user. The pair of ear caps 122 and 127 are formed of a resilient material to be easily worn in the ears of the user. The pair of ear caps 122 and 127 include a left ear cap 122 and a right ear cap 127 provided on front surfaces of the left receiver 121 and the right receiver 126, respectively.

Figure 4:
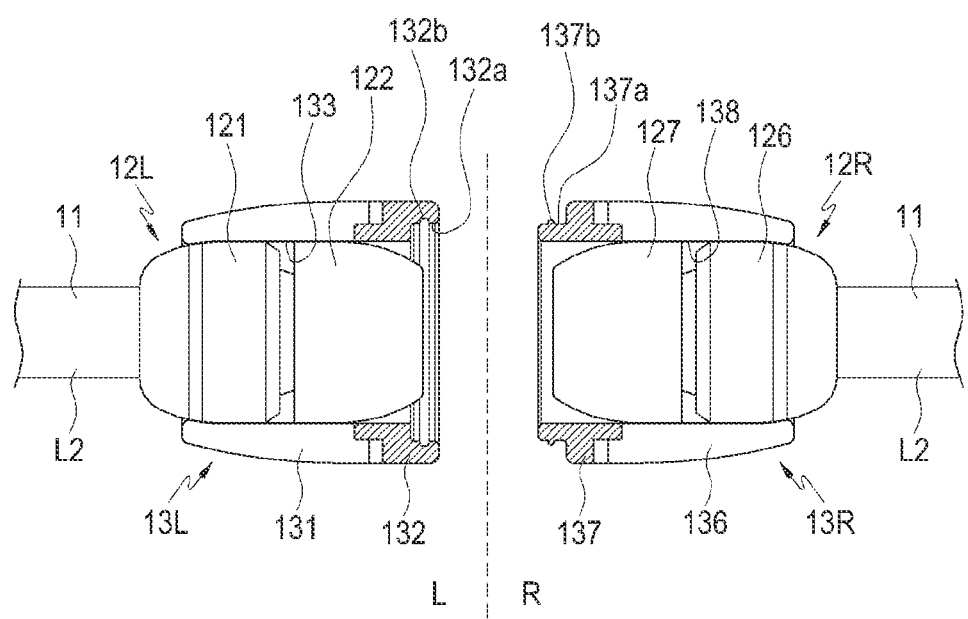
FIG. 4 illustrates a pair of ear parts and coupling cases provided around the ear parts of a Bluetooth headset, according to an embodiment of the present invention.
Figure 5:
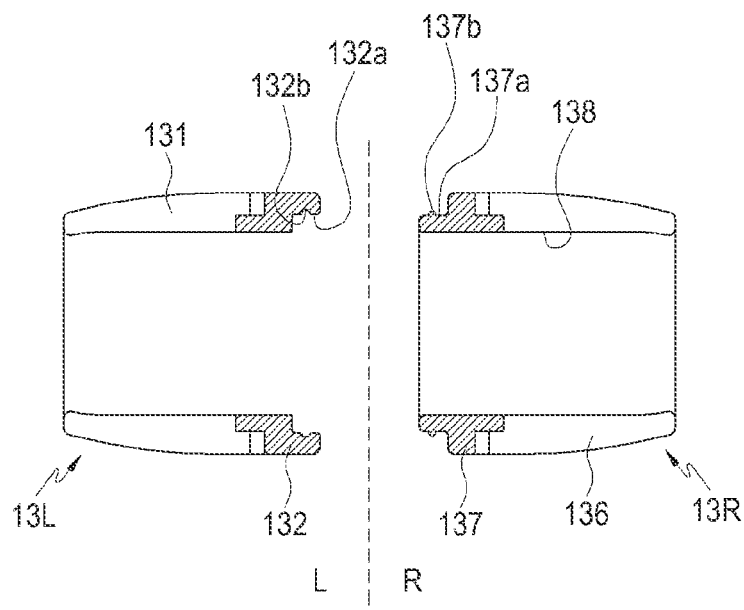
FIG. 5 illustrates a pair of coupling cases of a Bluetooth headset, according to an embodiment of the present invention.
Figure 6:
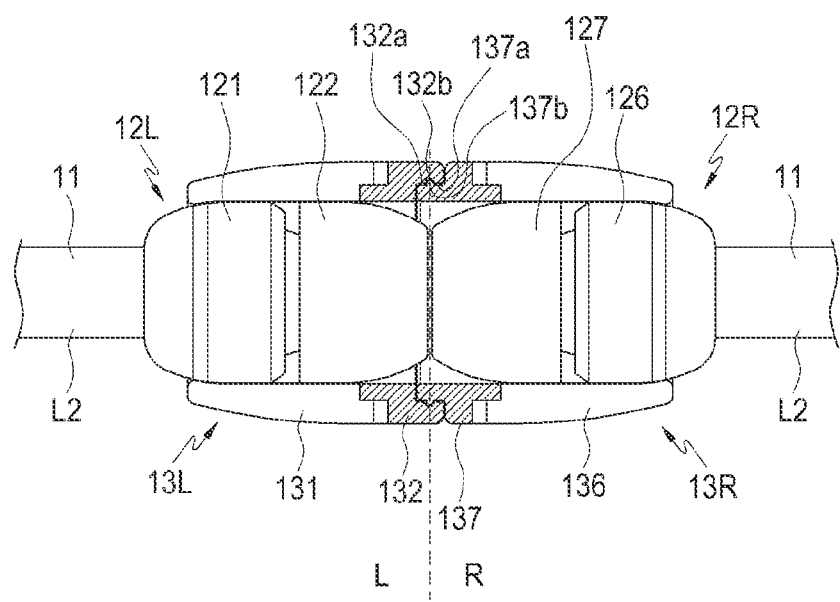
FIG. 6 illustrates a pair of coupling cases of a Bluetooth headset, in a coupled state, according to an embodiment of the present invention.

FIG. 4 illustrates a pair of ear parts and coupling cases provided around the ear parts of a Bluetooth headset, according to an embodiment of the present invention. FIG. 5 illustrates a pair of coupling cases of a Bluetooth headset, according to an embodiment of the present invention. FIG. 6 illustrates a pair of coupling cases of a Bluetooth headset, in a coupled state, according to an embodiment of the present invention.

Referring to FIGS. 3 to 6, the coupling cases 13 are provided between the guide stoppers 14 and the ear parts 12 according to modes M1 and M2, which will be described below, and are provided to be movable from the flexible band L2. The coupling cases 13 includes a first case 13L provided in the left ear parts 12L and a second case 13R provided in the right ear part 12R. The Bluetooth headset 100 is provided in the form of a ring, such as a necklace or a bracelet, as the pair of coupling cases 13, specifically, the first and second cases 13L and 13R, are coupled to each other while covering the left ear part 12L and the right ear part 12R, respectively (also see FIG. 7A). Accordingly, when the Bluetooth headset 100 is carried without being used, it may be worn on a neck or an arm of the user in the form of a necklace or a bracelet.

The pair of coupling cases 13 are formed of a resilient material and at least one of the coupling cases 13 is press-fitted with or extracted from the other of the coupling cases 13 to be attached to or detached from the other of the coupling cases 13. However, the structure of attaching or detaching the pair of coupling cases 13 is not limited thereto. For example, the attaching or detaching structure may include shapes such as a bolt and a nut. For example, one of the pair of coupling cases 13 may protrude forward and a screw thread may be formed on the protruding outer surface and the other of the pair of coupling cases 13 may be recessed and a screw thread may be formed on an inner surface of the recess such that as the screw thread of the protrusion may be engaged with the screw thread of the recess and be rotated, causing the couple case 13L and 13R to attach to or detach from each other. In this way, the structure of attaching or detaching the pair of coupling cases 13 may be modified and changed.

The Bluetooth headset 100 includes a first mode M1 and a second mode M2, according a coupling state of the coupling cases 13.

The first mode M1 corresponds to a state in which the Bluetooth headset 100 is worn on the body of the user like a necklace or a bracelet. That is, in the first mode M1 of the Bluetooth headset 100, the pair of coupling cases 13 are coupled to each other and the left ear part 12L and the right ear part 12R face each other such that the Bluetooth headset 100 has a ring shape, so that the Bluetooth headset 100 is worn on the neck or wrist of the user in the form of a necklace or a bracelet.

The second mode M2 of the Bluetooth headset 100 is a mode in which the pair of coupling cases 13 are released and the left and right ear parts 12L and 12R are introduced into the left and right ears of the user, respectively, to output an audio. In detail, in the second mode M2, the first case 13L of the Bluetooth headset 100 is moved from the left ear part 12L to be fixed to the first guide stopper 14a and the second case 13R is moved from the right ear part 12R to be fixed to the second guide stopper 14b. While the fixed band L1 is held on the neck of the user, the left flexible band L2 is bent at one end of the fixed band L1 and the left ear part 12L may be worn on the ear of the user. The left flexible band L1 is bent at an opposite end of the fixed band L1, and the right ear part 12R may be worn on the ear of the user (also see FIG. 7).

As discussed above, the coupling cases 13 may include a first case 13L provided in the left ear parts 12L and a second case 13R provided in the right ear part 12R.

The first case 13L is provided to cover the first ear part 12L (the left ear part 12L will be shown in the embodiment of the present invention) of the pair of ear parts 12 provided at one side of the band part 11, specifically, the left flexible band L2. The first case 13L has a space in which the left ear part 12L may be positioned therein, and if being separated from the left ear part 12L, the first case 13L is moved along the flexible band to be moved to the first guide stopper 14a. The first case 13L includes a first body 131 and a first coupling portion 132.

The first body 131 has an inner space to cover the left ear part 12L. That is, the first body 131 has an opening passing through a front surface and a rear surface of the first body 131 to surround the left ear part 12L, and may be moved from the left ear part 12L to the first guide stopper 14a along the flexible band L2.

The first coupling portion 132 is mounted to a front surface of the first body 131 and a front surface of the second case 13R may be caught by or released from the first coupling portion 132. In detail, the first coupling portion 132 is configured such that a boss 137a and a catching boss 137b of the second coupling portion 137 are positioned and caught to be fixed. The first coupling portion 132 includes a positioning recess 132a and a catching recess 132b. The positioning recess 132a is an opening provided on an inner side of the first case 13L and is stepped from an opening of the first body 131 such that a boss 137a of a second coupling portion 137, which will be described below, is inserted into and positioned in the positioning recess 132a. The catching recess 132b is introduced into the positioning recess 132a along an inner surface of the positioning recess 132a, and a catching boss 137b of the second coupling portion 137 is positioned in the catching recess 132b to be fixed. The first coupling portion 132 is formed of a resilient material. Accordingly, as the second coupling portion 137 is resiliently deformed when being introduced or extracted, it may be press-fitted or withdrawn, so that the first case 13L may be simply attached and detached for the deformation in the first mode M1 or the second mode M2.

Although not shown, a rear surface coupling portion may be further formed on a rear surface of the first body 131 to be easily fixed to the first guide stopper 14a. The rear surface coupling portion is formed of a resilient material to be resiliently deformed when the first guide stopper 14a is introduced or extracted such that the coupling state of the first guide stopper 14a may be maintained or the first stopper 14a may be coupled more easily.

The second case 13R includes a second body 136 and a second coupling portion 137. The second body 136 has an inner space to cover the right ear part 12R. That is, the second body 136 has an opening passing through a front surface and a rear surface of the second body 136 to surround the right ear part 12R, and may be moved from the right ear part 12R to the second guide stopper 14B along the flexible band L2. The second coupling portion 137 is mounted to a front surface of the second body 136 and a front surface of the first case 13L may be caught by or released from the second coupling portion 137. In detail, the second coupling portion 137 is configured to be positioned in and caught by the positioning recess 132a and the catching recess 132b of the first coupling portion 132.

The second coupling portion 137 includes a boss 137a and a catching boss 132b. The boss protrudes from a front surface of the second body 136 to be introduced and inserted into the positioning recess 132a, and may be stepped from an outer surface to an inner side of the second body 136. The catching boss 137b protrudes along a circumference of an outer surface of the boss 137a, and when the boss 137a is introduced and inserted into the positioning recess 132a, the catching boss 137b is inserted into and fixed to the catching recess 132b. The second coupling portion 137 is formed of a resilient material. Accordingly, as the second coupling portion 137, as well as the first coupling portion 132, are resiliently deformed when the second coupling portion 137 is introduced into or extracted from the first coupling portion, the first coupling portion 132 may be press-fitted with or withdrawn from the second coupling portion 137, so that the first case 13L may be simply attached and detached for the deformation in the first mode M1 or the second mode M2.

In detail, the first coupling portion 132 of the first coupling case 13L couples to the second coupling portion 137 of the second coupling case 13R through interference-fitting.

Figure 7A:
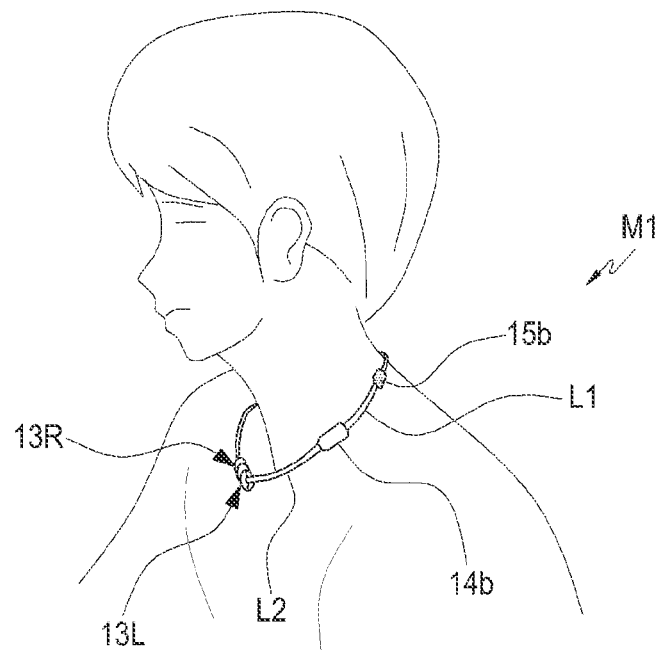
FIGS. 7A and 7B illustrates wearing states of a Bluetooth headset, according to a first mode and a second mode of the Bluetooth headset, according to an embodiment of the present invention.
Figure 7B:
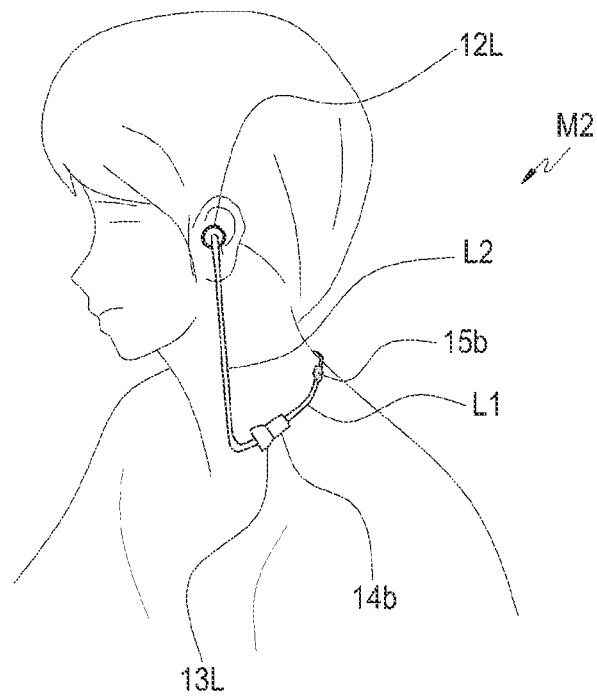

FIGS. 7A and 7B illustrates wearing states of a Bluetooth headset, according to a first mode and a second mode of the Bluetooth headset, according to an embodiment of the present invention.

Referring to FIGS. 7A and 7B, the Bluetooth headset 100 may be carried in the first mode M1 or the second mode M2, based on whether the user uses the Bluetooth headset 100 for output of an audio.

As described above, when the user does not use the Bluetooth headset 100, the Bluetooth headset 100 may be carried on the body of the user in the first mode M1, as shown in FIG. 7A. That is, the pair of coupling cases 13 are coupled to each other while covering the ear parts 12, in a state in which the Bluetooth headset 100 is suspended on the neck or wrist of the user. As such, the Bluetooth headset 100 may be carried while being suspended on the body of the user. The first case 13L covers the left ear part 12L, and the first coupling portion 132 is located on the front surface of the left ear part 12L. The second case 13R covers the right ear part 12R, and the second coupling portion 137 is located on the front surface of the right ear part 12R. If the first case 13L and the second case 13R, that is, the boss 137a and the positioning recess 132a, are pressed while being engaged with each other, the second coupling portion 137 is inserted into the first coupling portion 132 by the resiliency of the first coupling portion 132 and the second coupling portion 137. That is, the boss 137a is further introduced into the positioning recess 132a, and the catching boss 137b is caught by and fixed to the catching recess 132b (see FIGS. 1, 3A, and 3B). Thus, in the first mode M1, the user may hold the Bluetooth headset 100 in the form of a necklace or a bracelet without carrying the Bluetooth headset 100 in his or her hand or bag.

While the Bluetooth headset 100 is carried in the form of a necklace or a bracelet, it may be used in the second mode M2 for outputting an audio, as shown in FIG. 7B. That is, the coupling of the pair of coupling cases 13 is released such that the Bluetooth headset 100 may be used in the second mode M2. That is, if the user pulls the first case 13L and the second case 13R, the boss 137a and the catching boss 137b introduced into and caught by the positioning recess 132a and the catching recess 132b are separated from the positioning recess 132a and the catching recess 132b. The coupling of the pair of coupling cases 13 is released and the left and right ear parts 12L and 12R become separated from each other. The first case 13L and the second case 13R whose coupling is released are moved from the left and right ear parts 12L and 12R along the flexible band L2 to be coupled to the first and second guide stoppers 14a and 14b to be fixed. The user bends the flexible band L2 from the fixed band L1 to move the flexible band L2 toward the ears of the user, so that the left and right ear parts 12L and 12R may be worn on the ears of the user.

While the present invention has been shown and described with reference to certain embodiments thereof, it will be understood by those skilled in the art that various changes in form and details may be made therein without departing from the spirit and scope of the present invention as defined by the appended claims.

For example, although it has been shown in the embodiment of the present invention described herein, that two control portions 15a and 15b are provided at opposite sides of the fixed band L1, only one control portion may be provided on the fixed band.

Further, although it has been shown in the embodiment of the present invention that one of the guide stoppers 14 includes a button part, the present invention is not limited thereto. For example, both the two guide stoppers 14a and 14b may include button parts such that the Bluetooth headset 100 may be controlled, or the button parts may be provided separately and the guide stoppers 14 may be provided at opposite ends of the fixed band L1.

Further, although the coupling structure of the coupling cases 13, according to the embodiment of the present invention described herein, is provided such that the first and second cases 13R and 13L are engaged as they are pressed in the same direction or in different directions, the present invention is not limited thereto. As described above, a pair of a bolt and a nut may be rotated with respect to each other to be coupled.

Thus, the structures described herein with reference to an embodiment of the present invention may be modified and change.

What is claimed is:

1. A Bluetooth headset comprising:
    a band part including a first end and a second end;
    a first ear part provided at the first end of the band part, wherein the first ear part includes a first receiver and a first ear cap surrounding the first receiver;
    a second ear part provided at the second end of the band part, wherein the second ear part includes a second receiver and a second ear cap surrounding the second receiver;
    a first coupling case that covers the first ear part; and
    a second coupling case that covers the second ear part,
    wherein the first coupling case and the second coupling case are movable along the band part,
    wherein the first coupling case and the second coupling case detachably fix on the band part, and
    wherein the first coupling case and the second coupling case detachably couple to each other while covering the first ear part and the second ear part such that the band part is arranged in a wearable ring shape.

2. The Bluetooth headset of claim 1, further comprising a control portion that is fixed on the band part between the first and second ends.

3. The Bluetooth headset of claim 2, further comprising guide stoppers fixed to the band part for restricting movement of the first coupling case between the first ear part and the control portion and for restricting movement of the second coupling case between the second ear part and the control portion.

4. The Bluetooth headset of claim 3, wherein at least one of the guide stoppers comprises a button for controlling the control portion.

5. The Bluetooth headset of claim 3, wherein the guide stoppers are formed of a resilient material.

6. The Bluetooth headset of claim 3, wherein the first and second coupling cases are moveable between the ear parts and the guide stoppers, and the first and second coupling cases detachably couple to the guide stoppers.

7. The Bluetooth headset of claim 3, wherein the first coupling case comprises:
    a first body covering the first ear part and having an opening in which the first ear part is positioned at an inner side thereof; and
    a first coupling portion provided on a front surface of the first body, such that a front surface of a second body of the second coupling case is caught by or released from the first coupling portion.

8. The Bluetooth headset of claim 7, wherein the first body comprises a rear surface coupling portion that engages with and fixes to one of the guide stoppers.

9. The Bluetooth headset of claim 7, wherein the first coupling portion comprises:
    a positioning recess into which a second coupling portion is inserted at an inner side of the front surface of the first coupling case, and
    a catching recess recessed along an inner surface of the positioning recess.

10. The Bluetooth headset of claim 9, wherein the first coupling portion is formed of a resilient material.

11. The Bluetooth headset of claim 9, wherein the second coupling case comprises:
    the second body covering the second ear part and having an opening in which the second ear part is positioned at an inner side thereof; and
    a second coupling portion provided on a front surface of the second body to be introduced into or extracted from the first coupling portion to attach to or detach from the first coupling portion.

12. The Bluetooth headset of claim 11, wherein the second body comprises a rear surface coupling portion that engages with and fixes to one of the guide stoppers.

13. The Bluetooth headset of claim 11, wherein the second coupling portion comprises:
    a boss protruding from a front surface of the second coupling portion and configured to be positioned in the positioning recess of the first coupling portion, and
    a catching boss protruding along an outer surface of the boss and configured to be inserted into the catching recess of the first coupling portion.

14. The Bluetooth headset of claim 13, wherein the second coupling portion is formed of a resilient material.

15. The Bluetooth headset of claim 1, wherein front surfaces of the first and second coupling cases are formed of a resilient material.

16. The Bluetooth headset of claim 1, wherein the first coupling case comprises a first coupling portion provided on a front surface thereof, wherein the second coupling case comprises a second coupling portion provided on a front surface thereof, and wherein the second coupling portion is configured to be fitted and engaged with the first coupling portion.

17. The Bluetooth headset of claim 16, wherein the first coupling portion comprises:

a positioning recess into which the second coupling portion is inserted at an inner side of the front surface of the first coupling case, and a catching recess recessed along an inner surface of the positioning recess.

18. The Bluetooth headset of claim 17, wherein the second coupling portion comprises:

a boss protruding from the front surface of the second coupling case and positioned in the positioning recess, and a catching boss protruding along an outer surface of the boss and inserted into the catching recess.

19. The Bluetooth headset of claim 1, wherein the band part further comprises:

a fixed band including at least one control portion; and a first flexible band extending between a first end of the fixed band and the first end of the band part; and a second flexible band extending between a second end of the fixed band and the second end of the band part, wherein the first and second flexible bands are configured to be flexibly deformed.

20. A Bluetooth headset comprising:

a band part, wherein the band part comprises:

a fixed band including:

a first end;

a second end;

at least one control portion positioned between the first end and the second end; a first guide stopper positioned at the first end of the fixed band; and a second guide stopper positioned at the second end of the fixed band a first flexible band extending from the first end of the fixed band;

a second flexible band extending from the second end of the fixed band;

a first ear part provided at one end of the first flexible band, wherein the first ear part includes a first receiver and a first ear cap surrounding the first receiver;

a second ear part provided at one end of the second flexible band, wherein the second ear part includes a second receiver and a second ear cap surrounding the second receiver;

a first coupling case that covers the first ear part; and a second coupling case that covers the second ear part, wherein the first coupling case and the second coupling case detachably couple to each other such that the band part is arranged in a wearable ring shape, wherein the first coupling case and the second coupling case are configured to move between the respective first and second guide stoppers and the first and second ear parts on the first and second flexible bands, and wherein the first coupling case and the second coupling case are configured to detachably couple to the respective first and second guide stoppers.

* * * * *